Figure 1:
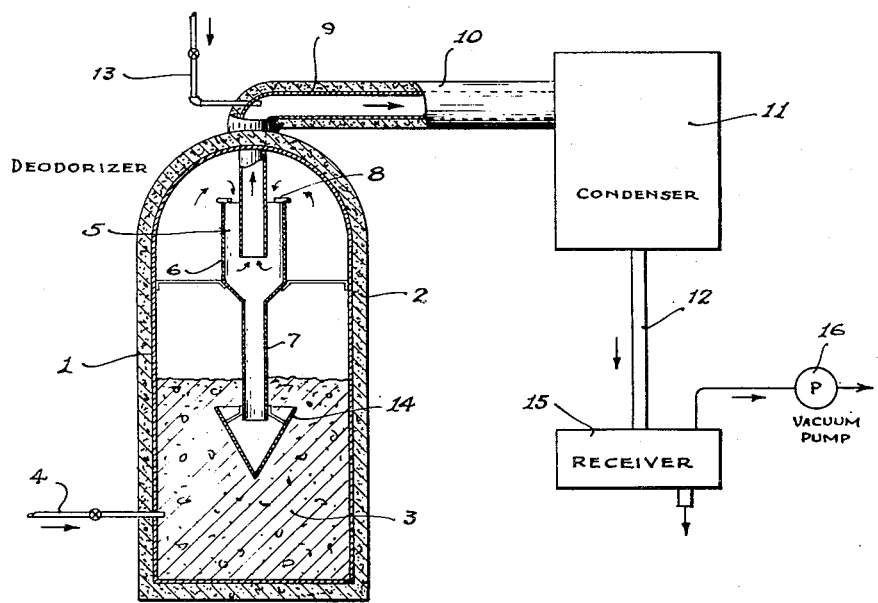

Oct. 11, 1949.  J. K. GUNTHER  2,484,788
DEODORIZATION AND DISTILLATION OF FATS
Filed March 3, 1945

INVENTOR.
James K. Gunther
BY
R.G. Story
ATTORNEY

Patented Oct. 11, 1949

2,484,788

UNITED STATES PATENT OFFICE 2,484,788

DEODORIZATION AND DISTILLATION OF FATS

James K. Gunther, Decatur, Ind., assignor, by mesne assignments, to Swift & Company, Chicago, Ill., a corporation of Illinois Application March 3, 1945, Serial No. 580,895

3 Claims. (Cl. 202—66)

1

The present invention relates to a distillation process and apparatus therefor and particularly such processes and apparatus in which small droplets of liquids entrained in the distillate vapor are removed and returned to the body of liquid being distilled.

A common problem encountered in connection with distillation is the entrainment of extremely small liquid droplets in the distillate vapors so that they are carried in this form from the still when the vapors are withdrawn therefrom. This represents a considerable disadvantage whether the vapors being removed from the still consists, when condensed, of the purified liquid itself or the impurities which have been separated from the body of liquid remaining behind in the still. In the first case, impurities would be carried along in the unvaporized liquid droplets and in the second case the entrained liquid represents a loss of the material being purified.

It has long been common practice to remove the entrained liquid particles from the vapors prior to their condensation and return the separated liquid to the main body of liquid in the bottom portion of the still and one of the most efficient and practical methods for accomplishing this end is to pass the vapors and the liquid entrained therein into a device which imparts a rapid whirling motion to the vapors thereby effecting a centrifugal separation of the liquid from the vapors. One special form of such a device which is in common usage today is the so-called cyclone separator.

However, in every instance of which I am aware the separating device has been disposed exteriorly of the still itself which necessitates a costly installation and requires a very high heat input due to radiation losses. It is readily apparent that if the temperature is allowed to drop appreciably during the separation stage a considerable quantity of the vapors will be condensed and returned to the still which provides for very uneconomical operation. I have found that by placing the separator entirely within the body of the still that these disadvantages are done away with to a very large degree while on the other hand all of the well recognized advantages are maintained.

Although by no means limited thereto the present invention is especially adaptable to a steam distillation process. This is true because the bubbles of steam breaking away from the surface of the body of liquid in the still tend to break up the liquid at the surface into extremely small particles and droplets which then become entrained in the arising vapors.

A still more specific application of the present invention wherein its advantages have been utilized to a very high degree is in a process for the deodorization of fats in which the fatty bodies are subjected while in the liquid state to steam stripping in a system in which a high degree of vacuum is maintained. Almost all vegetable and animal oils or fats intended for edible purposes including hydrogenated oils are subjected to a steam deodorization process. In this process the oils or fats are usually placed in a large vertically elongated heat insulated chamber which may hold as much as a tank car of oil. Steam is introduced into the bottom of the chamber through a distributor to heat the oil to a temperature ranging from approximately 350° to 450° F. and to assist in liberating volatiles from the oil. As high a vacuum as practicable is maintained in the deodorizing chamber by a suitable condensing and vacuum system so that the combined effect of the introduction of steam and vacuum condensing system is to remove volatile materials such as odor and taste bodies and at least a part of any free fatty acids present.

For purposes of illustration, the present invention will be described hereinafter in considerable detail in connection with such a process and the many attendant advantages will become readily apparent. It is to be understood, however, as pointed out above, that the invention is to be in no way limited to such a process.

It is, accordingly, an object of the present invention to provide a process of distillation wherein greater efficiency and heat economy are effected.

Another object of the present invention is to provide apparatus for distillation which operates extremely efficiently and economically especially from the standpoint of heat conservation.

Still another object of the invention is to provide a process of distillation wherein entrained liquids are removed from the distillate vapors and returned to the body of liquid being distilled in which costly jacketed vapor lines and traps are eliminated.

A still further object of the present invention is to provide distillation apparatus adapted to return liquid droplets entrained in the arising vapors in which costly jacketed vapor lines and traps are eliminated.

Yet another object of the present invention is to provide a steam distillation process involving removal of entrained liquid droplets from arising vapors and returning them to the body of liquid being distilled which operates at a higher level of efficiency and heat economy than that attained by conventional processes.

Another and further object of the invention is to provide a distillation process operating under vacuum wherein vapor entrained liquid droplets are returned to the body of liquid being distilled in which back pressure due to the resistance of pipe lengths and turns is greatly reduced.

Still another object of the present invention is to provide a process for deodorizing fats or fatty materials which is extremely efficient and economical particularly in the prevention of heat losses.

Figure 2:
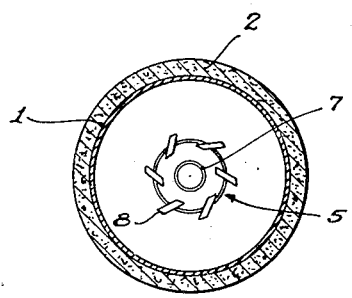

Other objects of the invention will be apparent from the following detailed description of the invention in connection with which a fat deodorizing process has been selected for illustrative purposes. In the drawings:

Figure 1 is a diagrammatic sketch of an apparatus suitable for carrying out the process of the present invention; and Figure 2 is a horizontal cross sectional view of the top portion of the entrained liquid separator shown in Figure 1.

In the drawings the numeral 1 indicates the body portion of the still which is surrounded by insulating material 2 to prevent, to as large a degree as possible, heat losses due to radiation. The still is filled by any suitable means to the desired level with fatty material 3. Through the wall of the still and into body of fat to be treated near the bottom portion thereof extends valved line 4 for the introduction of steam. This steam may be heated to a temperature such that it will provide all of the heat needed for the distillation of the fat impurities or supplemental heat may be provided as desired. A baffle 14 may be located at the bottom of the down pipe 7 to prevent rising steam from entering the down pipe.

In the upper portion of the still, but contained entirely within its walls, is disposed a conventional cyclone separator indicated generally by the numeral 5. This separator may consist of a body portion 6 having a conically shaped bottom from which a return conduit 7 extends down into the body of fat being treated. Into the separator 5 adjacent its upper end extend a number of tangentially disposed jet members 8.

Through the top of the still 1 and extending down into the cyclone separator 5 to the region adjacent its lower end is disposed a vapor outlet conduit 9 which is preferably jacketed with insulating material 10 from the point at which it emerges from the still. The conduit 9 communicates with any suitable condenser 11. Connected to the condenser 11 by a condensate line 12 is a receiver 15 to which is applied a pump 16 which may be employed to maintain the still and condenser system under the desired degree of vacuum.

A steam jet 13 may be directed into the conduit 9 to aid in the production of a high degree of vacuum in the still and the projection of vapors through the conduit.

In operation the rapidly rising vapors and liquid droplets mechanically entrained therein enter the cyclone separator 5 through the jets 8. The tangential disposition of the jets imparts a rapid whirling motion to the vapors and entrained liquid which gives rise to centrifugal forces which cause the heavier liquid droplets to be thrown out against the sides of the separator to be returned to the body of liquid in the still through the conduit 7. When the vapors enter the outlet conduit 9, they undergo an abrupt change of direction which tends to throw out any residual entrained liquid droplets still remaining in the vapors.

Thus, it can be seen that the vaporous impurities which are finally conducted to the condenser 11 are substantially free of valuable fatty material which had been originally entrained therein.

The advantages inherent in the above described apparatus and process are readily apparent. There is a great conservation of heat which would be dissipated in radiation losses if the separator were disposed externally of the still body. Also, there is much less opportunity for the vaporous impurities themselves to be cooled sufficiently to condense in the separator and be returned to the body of liquid in the still.

Moreover, there is a considerable conservation of material not only due to the face that lengths of pipe are eliminated but also because of thinner and less rigid constructions can be employed as the structure does not have to withstand the differential pressure of the atmosphere and the vacuum conditions under which the system is operating. Also, the loss of vacuum by means of the back pressure developed through the use of additional pipe length and turns is eliminated.

Having thus described my invention what is claimed as new is:

1. A process for deodorizing fats which comprises: confining a body of fat within a still, continuously subjecting the contents of said still to a high degree of vacuum, introducing steam into said body of fat, supplying sufficient heat to said fat to vaporize the impurities existing therein, introducing tangentially the evolved vapors and entrained particles of fat into a cyclone separating zone contained entirely within said still thereby imparting a rapid whirling motion whereby said particles of fat are centrifugally separated from said vapors, reversing the direction of flow of the vapors in said zone while separating said particles of fat from the vapors as a liquid, returning the separated liquid to a point below the surface of said body of fat, and withdrawing the vaporized ingredients from the still.

2. Apparatus for the deodorization of fat which comprises: means defining a treating chamber adapted to contain a body of said fat, means for producing and maintaining a vacuum within said chamber, means for admitting steam to the lower portion of said body of fat whereby impurities in said fat are vaporized and particles of liquid fat become entrained in the vapors, a cyclone separator disposed entirely within said chamber and above said body of fat for removing said particles of fat from said vapors, a plurality of tangentially disposed jet members for introducing vapors tangentially into the top of said cyclone separator, means for returning said particles of fat to a point below the surface of said body of said fat, means for discharging vapors from the top of said cyclone separator, and means for discharging said vapors from said chamber.

3. In an apparatus for the deodorization of fat, the combination of a treating chamber adapted to contain a body of said fat and having means for introducing steam into the lower portion thereof, means for producing a vacuum within said chamber, a cyclone separator mounted entirely within said chamber near the top thereof, said cyclone separator comprising a body portion having a plurality of jet members tangentially disposed about the periphery thereof whereby vapors produced by the steam deodorization of said fat are passed into the top of said separator with a whirling cyclone action, a conduit extending downwardly from the base of said separator to a point below the level of the fat in the lower portion of said chamber through which fat particles removed from the vapors in the separator are returned to the body of fat, and means for withdrawing fat-free vapors from the top of said separator and discharging them from said chamber.

JAMES K. GUNTHER.

REFERENCES CITED

The following references are of record in the file of this patent:

UNITED STATES PATENTS

| Number | Name | Date |
|---|---|---|
| 1,439,685 | Bodman | Dec. 26, 1922 |
| 2,202,007 | Ittner | May 28, 1940 |
| 2,202,008 | Ittner | May 28, 1940 |
| 2,214,658 | Browning | Sept. 10, 1940 |
| 2,237,175 | Conn | Aug. 17, 1943 |
| 2,361,411 | Murphy | Oct. 31, 1944 |
| 2,368,669 | Lee et al. | Feb. 6, 1945 |

FOREIGN PATENTS

| Number | Country | Date |
|---|---|---|
| 854,336 | France | Apr. 10, 1940 |